UNITED STATES PATENT OFFICE.

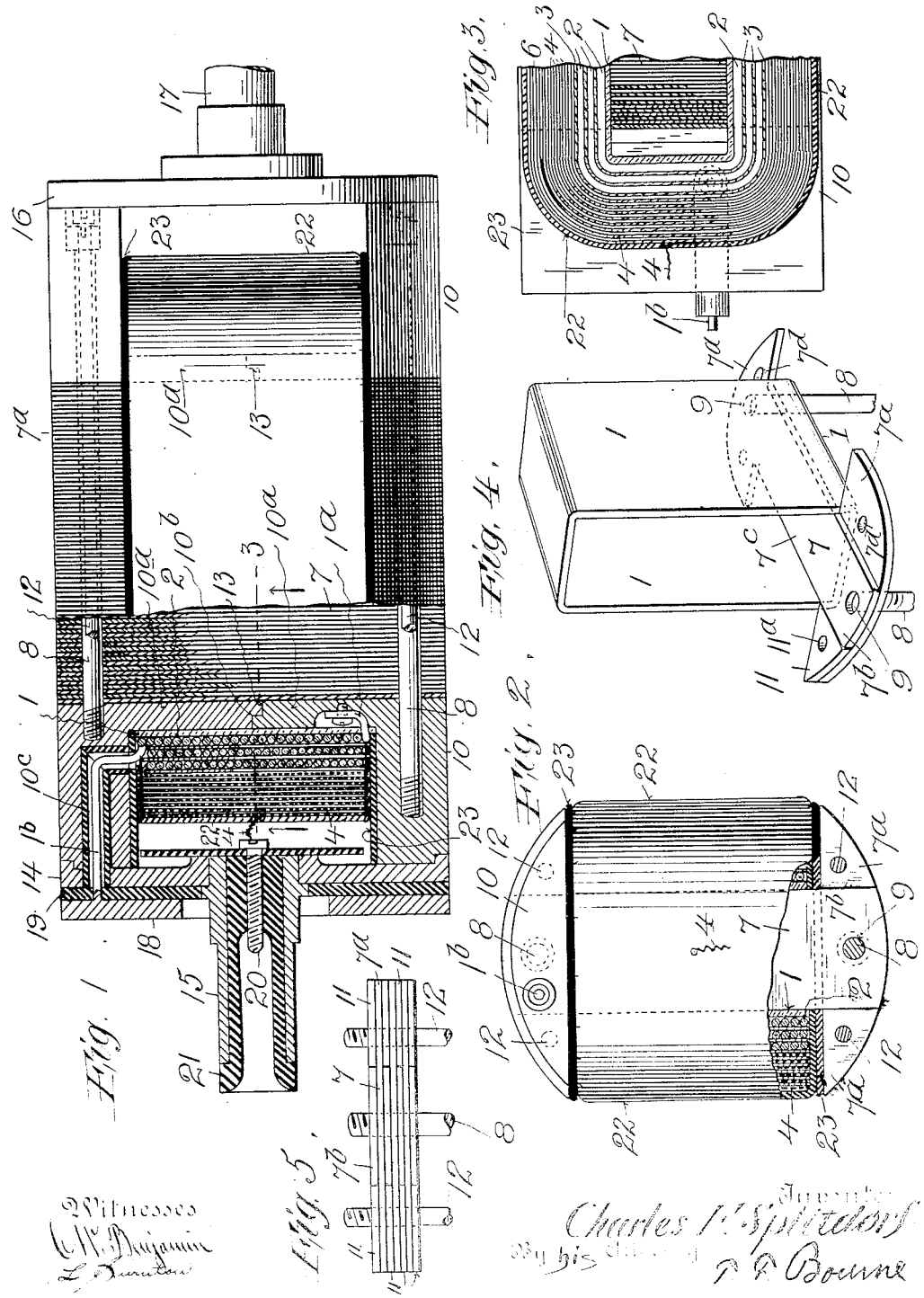

CHARLES F. SPLITDORF, OF NEW YORK, N. Y.

MAGNETO-ARMATURE.

No. 854,438.   Specification of Letters Patent.   Patented May 21, 1907.

Application filed November 1, 1906. Serial No. 341,585.

*To all whom it may concern:*

Be it known that I, CHARLES F. SPLITDORF, a citizen of the United States, and a resident of New York city, borough of Manhattan, New York, have invented certain new and useful Improvements in Magneto-Armatures, of which the following is a specification.

In armatures having a core provided with extensions or heads on opposite sides the primary and secondary wires are customarily wound directly upon the core, usually by hand operation, which causes the cost of producing the armature to be relatively high.

The object of my invention is to cheapen the cost of producing the armature and permit repairs to be conveniently made, at the same time producing accurate windings, and to this end my invention comprises an armature having the primary and secondary wires wound upon a suitable hollow form or casing, preferably of insulating material, and the laminated plates of the core passed through said form or casing within the winding from opposite sides thereof and secured together. Said plates have heads or enlargements at one end and their opposite ends are small enough to pass through the form or casing and in the form shown in the drawings said plates are passed through the form or casing alternately from opposite sides thereof so that the head of one plate lies between the ends of adjacent plates, whereby the core may be applied within the previously wound form or casing. I have also shown the heads at the ends of the armature core as divided or made in two parts so that their transverse portions may be passed through the form or casing within the previously wound wires. By this means I am enabled to utilize machine wound wires for the armature windings thereby producing accuracy in the windings and reducing the cost thereof.

My improvements also permit the thorough insulation of the windings of the armature to prevent the escape of high tension current from the secondary winding to the surrounding metal, and to this end I apply insulation, such as soft rubber, along the periphery and the sides of the wires while upon said form before the core plates and the heads of the armature are applied to the windings, and then harden said insulation, as by vulcanizing said rubber while it is upon the windings, whereby a homogeneous insulating covering on the windings is provided without joints or seams for the escape of current from the windings, and thereby the windings are thoroughly insulated from the adjacent metal, and there is little or no danger of the insulation becoming separated from the windings during use.

Other novel details of improvement pertaining to my invention will be more fully hereinafter set forth, and then pointed out in the claims.

Reference is to be had to the accompanying drawings forming part hereof, wherein, Figure 1 is a side view, partly in section, of a magneto armature embodying my invention, Fig. 2 is an end view of the armature, partly broken, the end disk being removed, Fig. 3 is a detail sectional view substantially on the line 3, in Fig. 1, Fig. 4 is a perspective view of the insulating form or casing to receive the core plates and upon which the wires are to be wound, and Fig. 5 is a detail side view of some of the laminated core plates looking at their ends or heads.

Similar numerals of reference indicate corresponding parts in the several views.

In the drawings the numeral 1 indicates a hollow form or casing, open on opposite sides, and preferably made of a suitable insulating material, as, for instance, pasteboard, upon which the primary wires 2 are wound, with interposed insulation 3 in usual manner, the secondary wire 4 being wound upon the winding 2 as usual, and said secondary wire may be grounded by connecting it with the primary wire 2 in the usual manner, insulation, such as paper 6, being interposed between the windings 4 as usual. The wires may be wound upon the form or casing 1 in a suitable winding machine in any well known manner, whereby the windings can be produced accurately, quickly and cheaply, ready for use in the armature.

The core plates 7 of suitable metal may be stamped out by dies, and at one end have heads or extensions $7^a$ of suitable shape and extending beyond the side walls of the form or casing 1, the opposite ends $7^b$ of said plates being reduced or of substantially the same size as the body portion $7^c$ of the plates, so as to pass through the bore or interior of the form or casing 1, as illustrated in Fig. 4. In applying the core plates 7 to the windings their ends $7^b$ are alternately passed through the form or casing 1 from opposite sides thereof, so that the heads $7^a$ of adjacent plates 7 alternate on opposite sides of the winding, the end 7ᵇ of one plate alining with the head portions of adjacent plates, whereby the core is built up within the previously wound wires 1 and 4.

The core plates 7 are held together within the windings by screws or rods 8 passing through suitable apertures 9 in the core plates, in usual manner, which rods also bind the armature heads 10 to the core plates. As spaces would be formed between adjacent heads 7ᵃ projecting beyond the sides of the ends 7ᵇ of contiguous plates, I may fill said spaces by washers or filling pieces 11, preferably of shape corresponding to the contiguous portions of the heads 7ᵃ, and to hold the plates together the more firmly the head portions of said plates may be provided with apertures 7ᵈ alined with apertures 11ᵃ in the washers 11, through which screws or rods 12 pass, which rods are secured to the heads 10. The washers 11 interposed in the spaces between heads 7 permit the screws 12 to be set up tight without bending the heads 7ᵃ, thereby producing a firm and uniform core within the windings.

The heads 10 of the armature may generally be of usual shape and their transverse core portions 10ᵃ pass through the windings, and for this purpose I have shown said heads made separable or divided, which will preferably be done at the central portion, as at 13 (Fig. 1), so that the portions 10ᵃ of said heads may pass through the windings from opposite sides. To assist in keeping the meeting parts of the heads 10 in proper relation within the windings, the meeting faces of the core portions 10ᵃ of said heads may be correspondingly provided with recesses and depressions, or with tongue and groove, as at 10ᵇ, serving to keep the heads centered. The primary winding may be secured to one of the heads 10, as at 1ᵃ, and one of said heads may be provided with a bore 10ᶜ to permit the passage of the primary terminal 1ᵇ. A disk 14 secured on said head 10 and having shaft 15, and a corresponding disk 16 secured to the other head 10 and having a shaft 17, support the armature for rotation. A metal disk 18 is secured upon disk 14 and insulated therefrom by insulation 19, and the terminal 1ᵇ is secured to the disk 18, so that the latter serves in connection with a suitable brush for transmitting the primary current in usual manner. The secondary winding 4 may be connected with a screw 20 carried by insulation 21 within shaft 15 for connection with a suitable contact in the secondary circuit.

By having the windings 1 and 4 placed upon the form or casing 1 before core plates 7 and heads 10 are secured in place I am enabled to thoroughly insulate the windings, and to this end I inclose the periphery and sides of the windings with insulation 22, which may be in the form of soft rubber placed securely around the windings, and then vulcanized in position so as to produce hard rubber insulation, or rubber insulation of any desired degree of hardness. Other insulation, such as fiber, may be applied over the windings in the manner stated and then hardened in any well known manner. By this means the windings are inclosed on their sides and periphery with a homogeneous insulation integral throughout and without seams, and thereby the windings are thoroughly insulated from the metal parts and the escape of high tension current from the secondary winding is prevented. Other insulation may be provided by means of insulating plates 23 interposed between the windings and the heads 7ᵃ and 10.

By means of my improvements the armature may be produced by first winding the wires upon the form or casing 1, then applying the insulation 22 thereto in the manner stated, then applying the core plates 7 and heads 10 through the form or casing 1, and securing said parts together by the screws 8 and 12.

The armature may be readily taken apart for repairs, and new windings applied to the metal parts if the wires are burned out, a saving thus being effected in repairs over the well known armatures in which a core of solid metal is provided with wires wound directly thereon.

Having now described my invention what I claim is:—

1. An armature having a core, a winding over the core, and heads at the ends of the armature having transverse portions divided between their side portions, the inwardly extending portions of said heads projecting within said winding, and means to secure said heads and core together.

2. An armature having windings, and a core comprising separate plates having heads at one end and their opposite ends reduced in size to pass through the windings, the heads of said plates alternating on opposite sides of the windings, heads at the ends of the armature having transverse portions divided between their side portions, the inwardly extending portions of said heads projecting within said windings, and means to secure said heads and plates together.

3. An armature having windings, and a core comprising separate plates having heads at one end and their opposite ends reduced in size to pass through the windings, the heads of said plates alternating on opposite sides of the windings, heads at the ends of the armature having transverse portions divided between their side portions, the inwardly extending portions of said heads projecting within said windings and having complemental projecting and recessed meeting portions, and means to secure said plates and heads together.

4. An armature having windings, core plates having heads at one end and the opposite ends reduced, said core plates being placed within the windings with their heads alternating on opposite sides of the windings providing spaces between adjacent heads, filling pieces within said spaces between said heads, and means for securing said plates and filling pieces together.

5. An armature having windings, core plates having heads at one end and the opposite ends reduced, said core plates being placed within the windings with their heads alternating on opposite sides of the windings providing spaces between adjacent heads, filling pieces within said spaces between said heads, said heads and filling pieces having alined apertures and rods passing through said apertures for binding said heads and filling pieces together.

6. An armature having windings, core plates having heads at one end and parallel side extending from said heads to the opposite ends adapted to pass freely through the windings and project without the same, said plates being located side by side with their heads alternating on opposite sides of the windings, heads at opposite ends of the armature, said heads being divided and having transverse portions extending respectively within the windings, and means to secure said heads and plates together.

7. An armature wire winding inclosed along its periphery and sides with insulation that is integral throughout.

8. An armature winding inclosed along its periphery and sides with vulcanized rubber insulation in a single piece without seams.

9. An armature having a core provided with heads, and windings around said core between said heads, said windings having insulation located over the periphery and along the sides and in a single piece without seams.

CHARLES F. SPLITDORF.

Witnesses:
T. F. BOURNE,
T. HUBERT.